United States Patent [19]

Happ

[11] Patent Number: 4,746,086

[45] Date of Patent: May 24, 1988

[54] NOSE LANDING GEAR JUMP STRUT ASSEMBLY

[75] Inventor: George R. Happ, Aurora, Ohio

[73] Assignee: Pneumo Abex Corporation, Boston, Mass.

[21] Appl. No.: 23,276

[22] Filed: Mar. 9, 1987

[51] Int. Cl.$^4$ ............................................. B64C 25/10
[52] U.S. Cl. .................................. 244/104 R; 244/63
[58] Field of Search ............... 244/100 R, 102, 104 R, 244/104 FP, 63; 267/64.16, 64.14, 64.18, 64.24, 64.28, 64.26

[56] References Cited

U.S. PATENT DOCUMENTS

| | | | |
|---|---|---|---|
| 1,068,165 | 7/1913 | Peterson | 244/63 |
| 1,254,898 | 1/1918 | Frost . | |
| 1,317,414 | 9/1919 | Atkinson . | |
| 1,745,081 | 1/1930 | Crumbaugh . | |
| 1,767,120 | 6/1930 | Canfiled | 244/63 |
| 1,810,244 | 6/1931 | Hicks | 244/104 |
| 1,850,711 | 3/1932 | Fait . | |
| 2,735,634 | 2/1956 | Fosness | 244/104 |
| 3,813,065 | 5/1974 | Hallesy et al. | 244/115 |
| 4,291,850 | 9/1981 | Sharples | 244/102 |
| 4,300,664 | 11/1981 | Helm et al. | 188/265 |
| 4,524,929 | 6/1985 | Gebhard | 244/63 |
| 4,625,619 | 12/1986 | Ceniza | 89/1.57 |
| 4,634,082 | 1/1987 | Kendall | 244/63 |
| 4,637,574 | 1/1987 | Handwerk | 244/63 |
| 4,687,158 | 8/1987 | Kettering | 244/63 |

Primary Examiner—Galen Barefoot
Attorney, Agent, or Firm—Renner, Otto, Boisselle & Lyon

[57] ABSTRACT

Nose landing gear jump strut assembly includes an outer main housing cylinder containing a jump cylinder which is normally retained in a retracted position but is extendable on command during the take-off ground roll of the aircraft to accelerate the outer main housing cylinder upward thus to rotate the nose of the aircraft upward and thereby increase the angle of attack of the aircraft. Within the jump cylinder is the main strut piston which is free to move relative to the jump cylinder except during extension of the jump cylinder, the main strut piston is hydraulically locked for movement with the jump cylinder. After the jump cylinder has been fully extended, and the aircraft starts to become airborne, the main strut piston will move to its fully extended position. Then the jump cylinder is retracted, while still leaving the main strut piston fully extended.

37 Claims, 7 Drawing Sheets

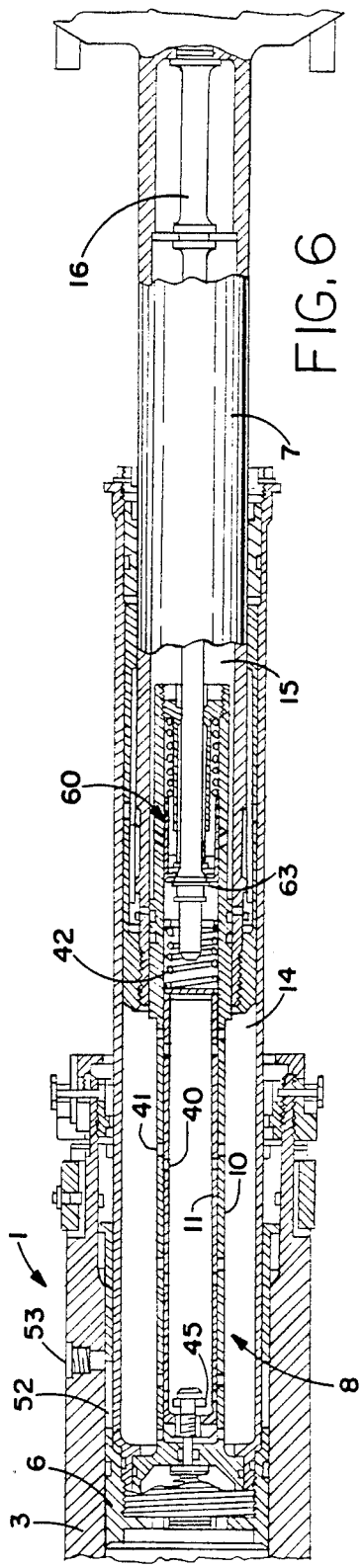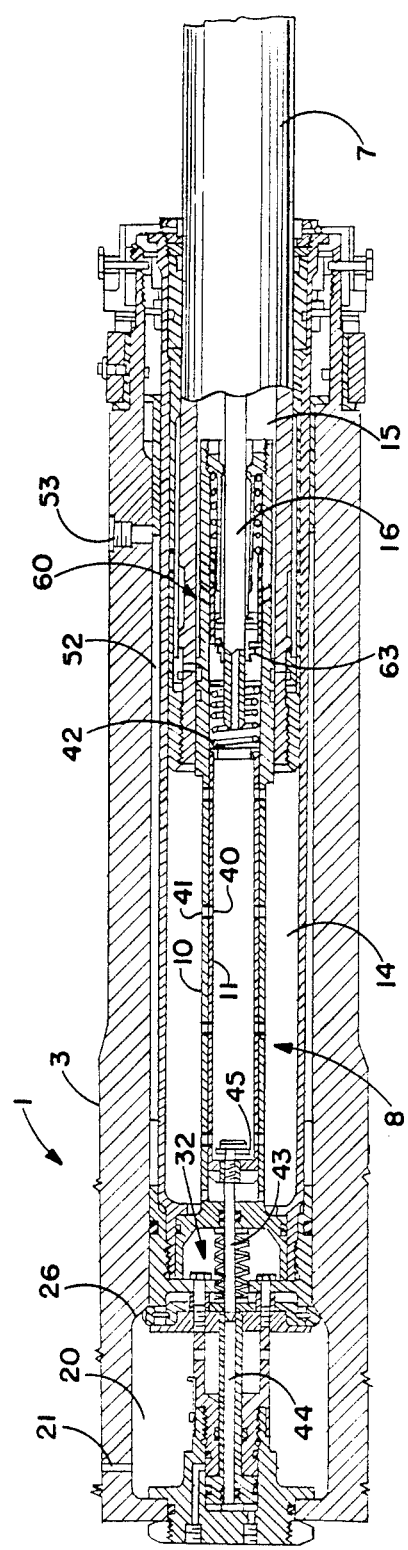
FIG. 6
FIG. 7 ional pressure within the interior of the strut to expand the strut and rotate the airplane to a high angle of attack appropriate for take-off. Although this substantially eliminates the high drag problem previously mentioned, it has the disadvantage that the strut cannot perform the usual energy dissipating functions during any portion of the take-off ground run.
NOSE LANDING GEAR JUMP STRUT ASSEMBLY

BACKGROUND OF THE INVENTION

This invention relates generally, as indicated, to a nose landing gear jump strut assembly for high performance aircraft such as operated by the military, to provide reduced take-off ground roll and/or overload capability for such aircraft.

There are occasions when it would be desirable to provide high performance military aircraft and the like with the capability of taking off in shorter distances than normal or of increasing the payload capability without increasing the distance required to take off.

It is generally known that such aircraft could take off in shorter distances at lower ground speeds or that the payload capability of the aircraft could be increased without increasing the take-off ground roll of the aircraft if the nose of the aircraft were somehow raised sooner than normal to increase the angle of attack and thus the lift of the aircraft. One way to do this is to provide the aircraft with a longer nose strut to raise the nose of the aircraft up. However, this has the disadvantage of putting the aircraft in a relatively high drag attitude during the entire take-off run.

Another way, which is disclosed in U.S. Pat. No. 4,524,929, is to restrain the landing gear strut in a shortened condition during the initial portion of the take-off ground run and then release the strut to permit high internal pressure within the interior of the strut to expand the strut and rotate the airplane to a high angle of attack appropriate for take-off. Although this substantially eliminates the high drag problem previously mentioned, it has the disadvantage that the strut cannot perform the usual energy dissipating functions during any portion of the take-off ground run.

SUMMARY OF THE INVENTION

With the foregoing in mind, it is a principal object of this invention to provide a novel jump strut assembly for rotating the nose of the aircraft upward at the prescribed time during the take-off ground run while still providing the usual shock absorbing functions during the major portion of the take-off ground run.

Another object is to provide such a jump strut assembly which is totally passive until activated on command to cause the nose of the aircraft to be accelerated upward on command during the take-off ground run.

Still another object is to provide such a jump strut assembly which is totally self-contained and completely mechanical.

Yet another object is to provide such a jump strut assembly with a jump cylinder that is extended on command to cause the nose of the aircraft to be accelerated upward, and a piston assembly that is hydraulically locked against movement relative to the jump cylinder during extension of the jump cylinder so that the piston assembly moves with the jump cylinder throughout its extension.

Still another object is to provide such a jump strut assembly in which the piston assembly is permitted to fully extend after the jump cylinder reaches its maximum stroke and the nose wheel load of the aircraft decreases during take-off, thus allowing the aircraft to leave the ground with the jump strut assembly in its fully extended configuration.

A further object is to provide such a jump strut assembly with a novel rough runway bypass valve arrangement that is mechanically reset upon full extension of the piston assembly.

Yet another object is to provide such a jump strut assembly in which the jump cylinder is fully retracted after the piston assembly has been fully extended.

Another object is to provide such a jump strut assembly in which the piston assembly is hydraulically unlocked from the jump cylinder after the jump cylinder has been fully retracted so that the jump strut assembly is free to absorb the full landing loads during landing of the aircraft.

These and other objects of the present invention may be achieved by providing the jump strut assembly of the present invention with an axially movable jump cylinder within an outer main housing cylinder in addition to the usual piston assembly. Connected to the jump cylinder is a support tube assembly including an outer support tube that contains an orifice to provide restricted flow between opposite sides of the piston assembly during movement of the piston assembly relative to the jump cylinder. Extension of the jump cylinder within the outer main housing cylinder is initially restrained by a releasable lock mechanism. A hydraulically powered actuator is provided for releasing the lock mechanism. When the actuator is pressurized by a signal from the aircraft, the lock mechanism releases, thus allowing a jump charge stored in a jump chamber above the jump cylinder to expand and extend the jump cylinder.

During the initial extension of the jump cylinder, an inner support tube moves relative to the outer support tube causing flow holes through the support tubes to close. The resulting pressure increase in the support tube assembly closes a check valve located at the top of the inner support tube, thus hydraulically locking the piston assembly for movement with the jump cylinder as the jump progresses, accelerating the outer main housing cylinder upward to rotate the nose of the aircraft upward to increase the angle of attack of the aircraft.

Further in accordance with the invention, as the aircraft begins to lift off the ground, the aircraft nose wheel load decreases and the pressure in the support tube assembly drops, whereby the check valve on the inner support tube reopens to permit the piston assembly to extend, allowing the jump strut assembly to leave the ground in a fully extended configuration.

Also in accordance with the invention, when the jump strut assembly is fully extended, the jump chamber pressure is vented, thus permitting stored energy in an externally mounted accumulator to retract the jump cylinder and reset the lock mechanism while leaving the piston assembly fully extended in its normal landing energy absorption mode.

Further in accordance with the invention, a rough runway bypass valve assembly may also be mounted in the support tube assembly, with provision for mechanically resetting the bypass valve assembly during full extension of the piston assembly.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 6 is a fragmentary longitudinal section showing the main strut piston as well as the jump cylinder fully extended;

FIG. 7 is a fragmentary longitudinal section showing the jump cylinder in the fully retracted and locked position with the main strut piston still fully extended;

DETAILED DESCRIPTION OF THE PREFERRED EMBODIMENT

Figure 1:
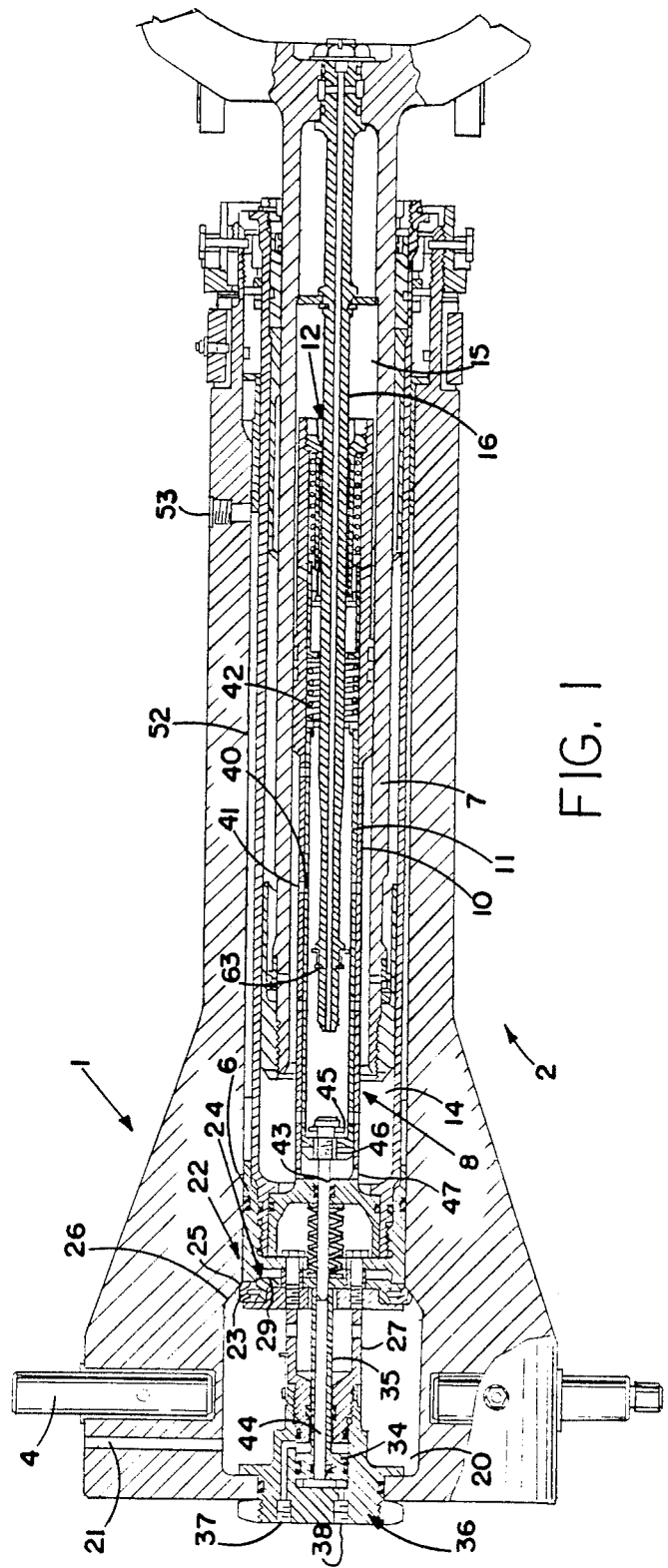
FIG. 1 is a fragmentary longitudinal section through a preferred form of jump strut assembly in accordance with this invention in which the jump cylinder and main strut piston are shown fully retracted within the main housing cylinder.

Referring now in detail to the drawings, and initially to FIG. 1 thereof, there is shown a preferred form of jump strut assembly 1 in accordance with this invention which generally consists of a main shock strut 2 including an outer main housing cylinder 3 having suitable mounts 4 at its upper or inboard end for connection to the nose of the aircraft in conventional manner. Suitable support struts and drag brace members and the like, not shown, may be provided for supporting the jump strut assembly in its down position and for retracting same during flight.

Axially movable within the outer main housing cylinder 3 is a jump cylinder 6 which, when extended on command during the take-off ground run of the aircraft as described hereafter, causes the outer main housing cylinder 3 and thus the nose of the aircraft to accelerate upwardly to increase the angle of attack of the aircraft, whereby the aircraft will either take off in a shorter distance at lower ground speeds than would otherwise be required or will be able to carry a heavier payload without increasing the take-off ground roll of the aircraft.

Axially movable within the jump cylinder 6 is a main strut piston 7 which extends outwardly therebeyond and also beyond the outer end of the outer main housing cylinder 3 to provide for the mounting of a wheel and tire assembly thereon (not shown). The main strut piston 7 is desirably generally tubular over its retracted length, to provide for receipt of a support tube assembly 8 therein.

Support tube assembly 8 desirably consists of an outer support tube 10 suitably connected at its upper end to the upper end of the jump cylinder 6 and an inner support tube 11 axially slidable within the outer support tube to provide for hydraulic locking of an orifice 12 in the outer support tube during extension of the jump cylinder to cause the jump cylinder and piston to move together as the jump progresses, in a manner to be subsequently described. The orifice 12 itself is desirably located at the outer or lower end of the outer support tube 10, and provides for restricted flow between upper and lower piston chambers 14, 15 on opposite sides of the orifice during extension and retraction of the piston within the jump cylinder. Such orifice 12 may, if desired, be a fixed orifice. However, preferably a metering pin 16, connected to the piston 7 for movement therewith, extends through the orifice 12 and into the support tube assembly 8 as shown. By controlling the taper of the metering pin 16 in relation to the size of the orifice 12 through which the metering pin extends, the dynamic load stroke curve of the jump strut assembly 1 can be controlled within certain limits at different strut-stroke positions, as well known in the art.

Contained within the main housing cylinder 3 adjacent the upper end thereof is a jump chamber 20 which may be charged with a suitable high pressure fluid, for example, 2000 psi nitrogen, through a suitable passage 21 in the inboard end of the main housing cylinder as schematically shown in FIG. 1 for use in extending the jump cylinder on command as described hereafter. The upper or inboard end of the jump cylinder 6 is acted upon by the high pressure fluid within the jump chamber urging the jump cylinder axially outwardly. However, the jump cylinder is restrained against extension relative to the main housing cylinder 3 by a releasable lock mechanism 22 which, in the preferred embodiment disclosed herein, consists of an expandable split lock ring 23 and associated mechanism 24 for expanding same. The details of such lock mechanism are best seen in FIGS. 3 and 4.

Figure 2:
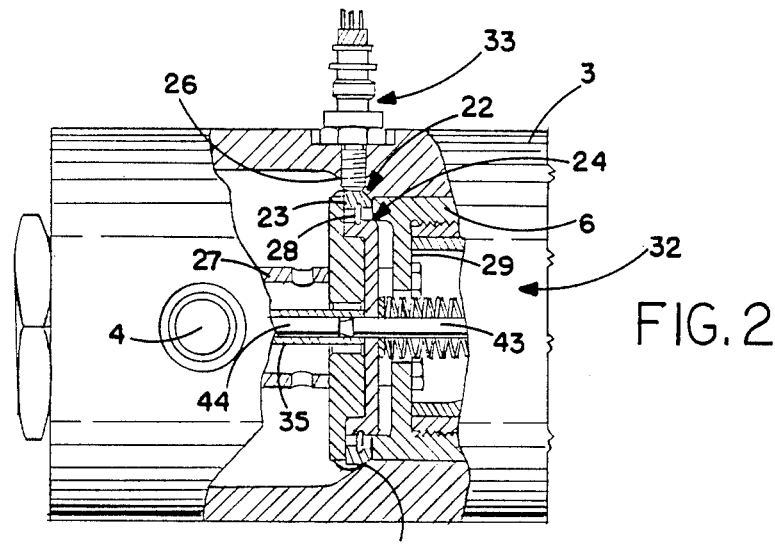
FIG. 2 is an enlarged fragmentary longitudinal section showing a portion of the jump cylinder and lock mechanism for locking the jump cylinder in its fully retracted condition, together with a proximity switch for detecting whether the jump cylinder is in its fully retracted, locked position.
Figure 3:
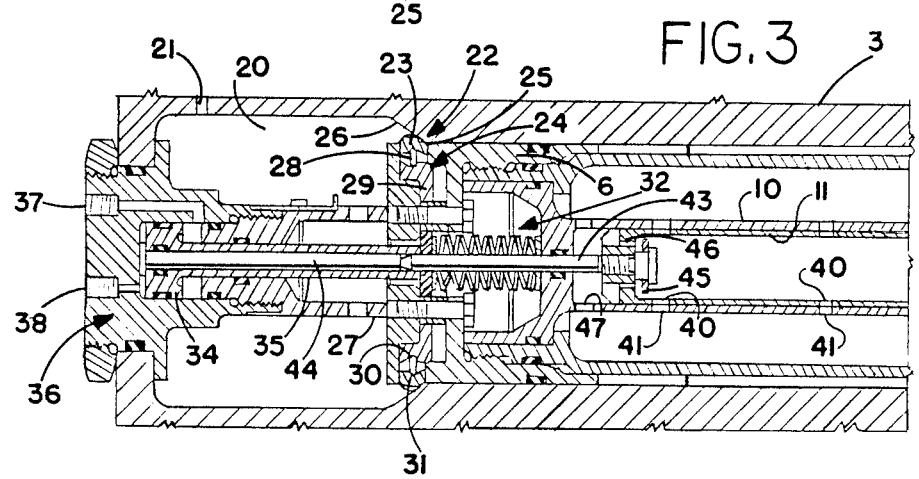
FIG. 3 is an enlarged fragmentary longitudinal section also showing the jump cylinder in the fully retracted, locked position as well as the mechanism for releasing the lock mechanism on command.
Figure 4:
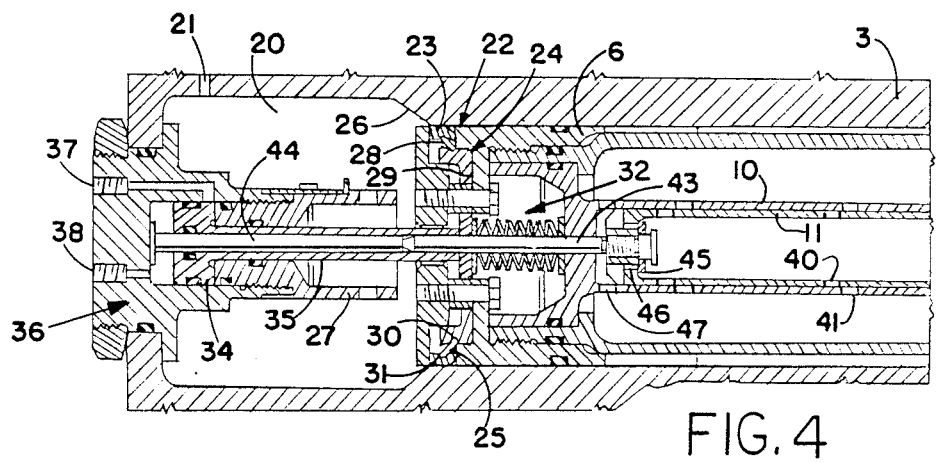
FIG. 4 is an enlarged fragmentary longitudinal section similar to FIG. 3 but showing the lock mechanism released and the jump cylinder starting to move to its fully extended position.

When the lock ring 23 is in the contracted position shown in FIG. 4, the jump cylinder 6 is free to extend within the main housing cylinder 3. However, when the jump cylinder 6 is fully retracted and the lock ring 23 is expanded as shown in FIGS. 1–3, a tapered end face 25 on the lock ring extends radially outwardly into engagement with a correspondingly tapered shoulder 26 on the inner diameter (I.D.) of the main housing cylinder 3 thus preventing extension of the jump cylinder within the main housing cylinder. Further retraction of the jump cylinder is prevented by a stop 27 at the axial inner end of a manifold 36 attached to the inboard end of the housing cylinder 3 for a purpose to be subsequently described.

The lock ring 23 is normally maintained in the expanded condition shown in FIGS. 1 and 3 by means of a series of lock links 28 which are captivated between the lock ring and an annular trigger member 29 concentrically mounted within the lock ring radially inwardly thereof. Both the lock ring 23 and trigger member 29 have respective internal and external annular grooves 30, 31 therein for receipt of the respective outer and inner edges of each of the lock links 28. When the trigger member 29 is in its axial innermost (leftmost) position shown in FIGS. 1 and 3, the annular grooves 30, 31 in the lock ring and trigger members are in substantial radial alignment with each other, whereby the lock links extend substantially radially therebetween to maintain the lock ring expanded. However, when the trigger member is moved to its axial outermost (rightmost) position shown in FIG. 4, the annular grooves are moved out of alignment with each other, thus causing the lock links to move to an overcenter position which allows the lock ring to contract.

The trigger member 29 is normally maintained in its innermost (uppermost) position shown in FIGS. 1-3 by means of a suitable spring member 32 which desirably consists of a plurality of Belleville spring washers interposed between opposing surfaces on the trigger member and outer support tube 10. The pressure on both sides of the trigger member 29 is the same. Accordingly, the force exerted by the spring member 32 on the trigger member need only be sufficient to expand the lock ring 23 and overcome the friction between the lock ring, lock links 28 and trigger member 29.

Before the jump chamber 20 is charged with high pressure fluid, the ground crew should make certain that the jump cylinder 6 is fully retracted and the lock ring 23 is in the fully expanded, locked condition shown in FIGS. 1-3. One way to do this is to provide a proximity switch 33 on one side of the housing cylinder (see FIG. 2) for detecting the presence or absence of the lock ring 23 in mating engagement with the tapered shoulder 26.

To release the lock mechanism, an unlock piston 34 is provided. Unlock piston 34 includes a tubular extension 35 engaging the upper (inner) side of the trigger member 29. Fluid pressure is supplied to and from opposite sides of the piston 34 through a manifold 36 attached to the inboard end of the housing cylinder. As clearly shown in FIGS. 3 and 4, the manifold 36 includes fluid ports 37, 38 for directing hydraulic fluid to and from opposite sides of the unlock piston 34. Standard aircraft pressure having a pressure, for example, of approximately 3000 psi, may be supplied to the manifold port 38 to cause the unlock piston to move in the direction of the trigger member 29 to release the lock mechanism 22 in response to a given signal to extend the jump cylinder 6 when the aircraft reaches a desired speed during take-off ground roll. Such a signal may be given, for example, when the pilot pulls the flight control stick back for take-off. Upon release of the lock mechanism, the charge of pressurized gas within the jump chamber 20 will be allowed to expand, thus causing rapid extension of the jump cylinder 6.

As long as the jump cylinder 6 is in the fully retracted and locked position shown in FIGS. 1-3, the inner support tube 11 is in the position shown with its radial holes 40 in alignment with additional radial holes 41 in the outer support tube 10, thus permitting controlled flow through the orifice 12 and support tube assembly 8 from one piston chamber 14, 15 to the other. A spring 42 (shown in FIGS. 1 and 5-7) acts on the outer end of the inner support tube, thus urging a stop pin 43, which extends coaxially from the upper end of the inner support tube through aligned holes in the upper end of the outer support tube 10 and trigger member 29, into engagement with another stop pin 44 concentrically located within the unlock piston 34 to maintain such radial holes 40, 41 in alignment with each other. However, as soon as the jump cylinder 6 starts to extend, the main housing cylinder 3 is forced upwardly (to the left as viewed in FIGS. 1-4) relative to the jump cylinder, whereby the spring 42 acting on the inner support tube 11 causes the inner support tube to follow the upward movement of the housing cylinder until the inner support tube bottoms out against the upper (inner) end of the outer support tube, thus causing the flow holes 40, 41 in the support tube assembly 8 to close (see FIG. 4). This results in an increase in pressure within the support tube assembly 8 which acts on a flapper valve 45 within the inner support tube 11 to cause the flapper valve to move upwardly into engagement with the inner end of the inner support tube and thereby close off additional flow holes 46 therethrough communicating with the upper piston chamber 14 through additional flow holes 47 adjacent the inner (upper) end of the outer support tube 10. With the flow holes 40, 41 and 46, 47 through the inner and outer support tubes effectively blocked, the piston 7 becomes hydraulically locked against movement relative to the jump cylinder 6, whereby the jump cylinder 6 and piston 7 will move together without further stroking of the piston as the jump progresses (see FIG. 5).

During such rapid extension of the jump cylinder, the main housing cylinder 3 will be accelerated upwardly until the jump cylinder reaches its maximum stroke of, for example, 8.25 inches. This in turn causes the nose of the aircraft to rotate upwardly correspondingly to increase the angle of attach and lift of the aircraft. As the nose of the aircraft begins to rotate upwardly, the load on the nose wheel of the aircraft begins to decrease and the pressure in the support tube assembly 8 drops. When the internal pressure in the support tube assembly drops approximately to the static strut service pressure in the upper piston chamber 14, such pressure acting on the flapper valve 45 through the radial and axial holes 47, 46 in the outer and inner support tubes 10, 11 will cause the flapper valve 45 to reopen, thus permitting the piston 7 to extend and allowing the jump strut assembly 1 to leave the ground in its fully extended configuration as shwon in FIG. 6.

Figure 8:
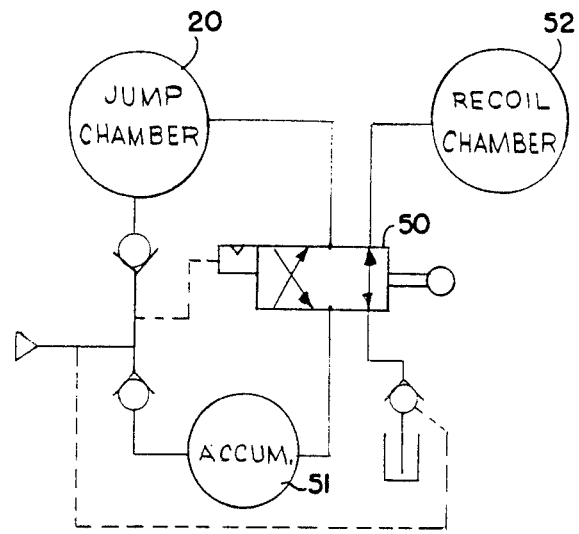
FIGS. 8 and 9 are schematic illustrations showing one form of valve assembly which may be used to vent the jump chamber and pressurize the recoil chamber of the jump strut assembly in order to cause the jump cylinder to retract.
Figure 9:
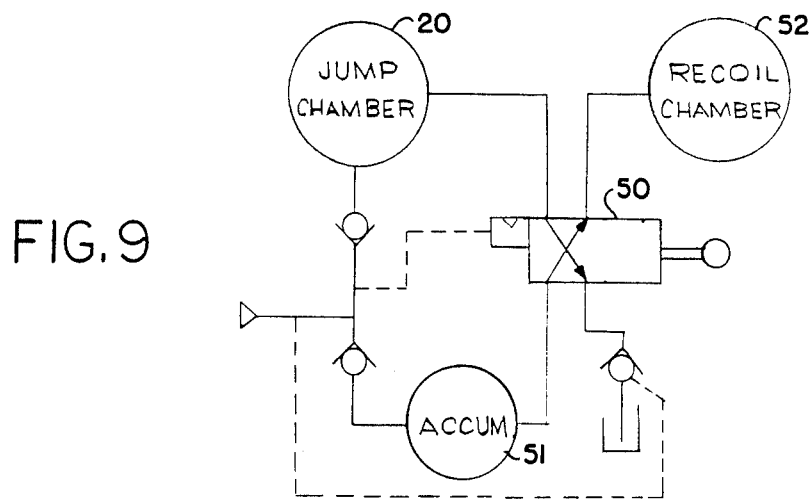
Figure 10:
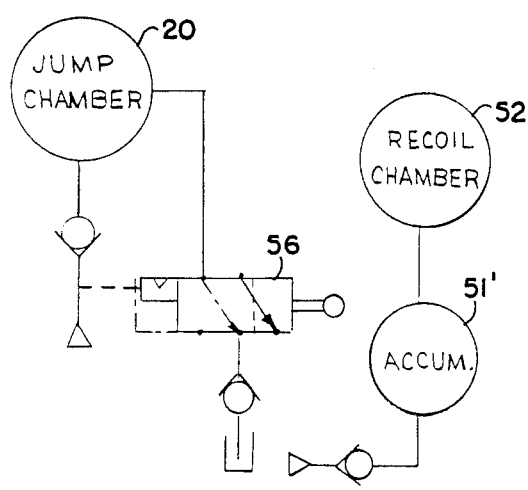
FIG. 10 is a schematic illustration of another valve assembly which may be used to vent the jump chamber so that the fluid pressure within the recoil chamber acting on the jump cylinder will cause the jump cylinder to retract.

When the jump strut assembly 1 is in the fully extended position shown in FIG. 6, a valve 50 fluidically connected to the jump chamber 20 as schematically shown in FIGS. 8 and 9 may be activated by a sensor on the torque arms (not shown) which senses the full extension of the jump strut assembly to vent the pressure from the jump chamber 20. Pressurized fluid in an externally mounted accumulator 51, also schematically shown in FIGS. 8 and 9, will then be supplied to a recoil chamber 52 within the main housing cylinder 3 through a retract port 53 therein (see FIGS. 1, 5-7, 11 and 12) to cause the jump cylinder 6 to retract into the main housing cylinder 3. The recoil accumulator 51 may either be a high pressure, low volume accumulator such as shown in FIGS. 8 and 9, pressurized, for example, to 2000 psi, or a low pressure/high volume accumulator 51' such as shown in FIG. 10, having an initial pressure, for example, of 700 psi. If a high pressure/low volume accumulator 51 is used, the accumulator will only be connected to the recoil chamber 52 by actuation of the valve 50 from the FIG. 8 position to the FIG. 9 position when full extension of the jump strut assembly has been reached, whereas if a low pressure/high volume accumulator 51' is used, the accumulator may be continuously connected to the recoil chamber 52 as schematically shown in FIG. 10 so that there is a build-up of pressure in the accumulator, for example, to 850 psi, during extension of the jump cylinder. This stored energy in the recoil accumulator 51' will then drive the jump cylinder 6 back into the main housing cylinder 3 when valve 56 is moved to the phantom line position shown in FIG. 10 to vent the pressure from the jump chamber 20.

Figure 5:
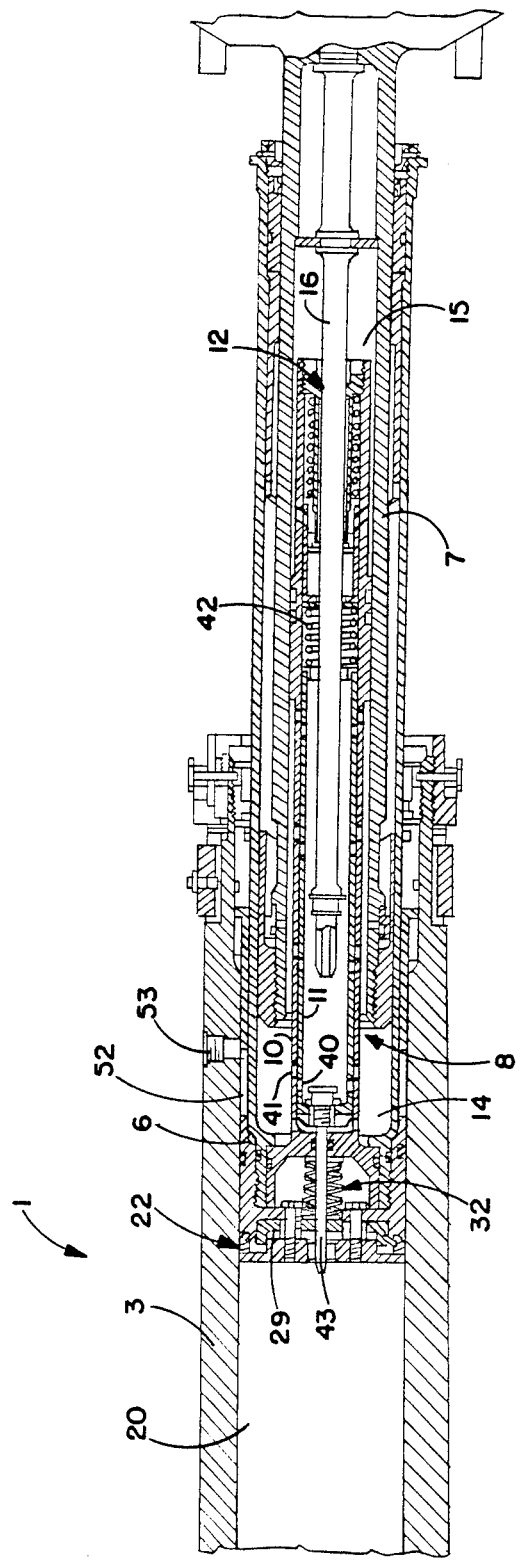
FIG. 5 is a fragmentary longitudinal section showing the jump cylinder in its fully extended position and the main strut piston hydraulically locked against movement relative to the jump cylinder.

The spring member 32 acting on the trigger member 29 continually urges the trigger member toward its original position (toward the left as viewed in FIG. 5). Accordingly, the lock ring 23 will expand into overlapping engagement with the tapered shoulder 26 in the main housing cylinder 3 as soon as the jump cylinder 6 is fully retracted following the venting of the jump chamber 20 pressure once again to lock the jump cylinder in the fully retracted position shown in FIGS. 1-3, the tapered shoulder 26 preventing extension of the jump cylinder and the stop 27 preventing further retraction of the jump cylinder. As the jump cylinder 6 approaches its fully retracted position, the stop pin 43 on the inner support tube 11 will once again engage the stop pin 44 on the main housing cylinder 3 to cause the inner support tube 11 to move axially outwardly (downwardly) relative to the outer support tube 10. This brings the flow holes 40, 41 in the support tube assembly 8 back into alignment with each other, thus resetting the jump strut assembly for landing with the main strut piston 7 fully extended and in its normal landing energy absorption mode as shown in FIGS. 7. The jump cycle is now complete and the jump strut assembly is ready to absorb full landing loads by providing restricted flow from the lower piston chamber 15 to the upper piston chamber 14 through the orifice 12 and aligned holes 40, 41 in the support tube assembly 8 during the compression stroke of the piston upon landing of the aircraft.

If desired, a rough runway valve assembly 60, best seen in FIGS. 11-14, may also be built into the support tube assembly 8 to open one or more bypass passages 61 in the outer support tube 10 during aircraft taxiing so that fluid flow is not restricted to the orifice 12 alone, but is allowed to pass through the bypass passages 61 as well, providing a softer ride by increasing the strut stroke during taxiing.

Figure 11:
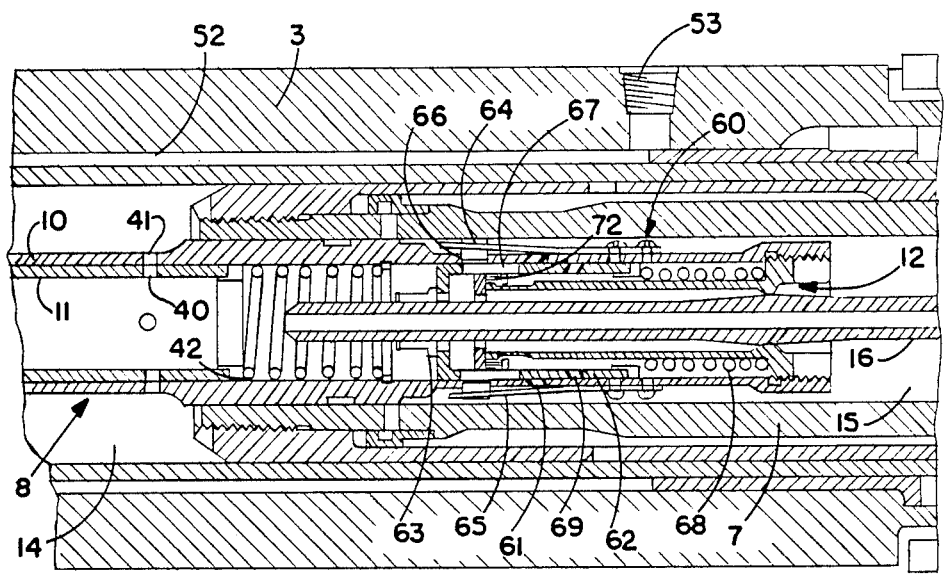
FIGS. 11 and 12 are enlarged fragmentary longitudinal sections through the rough runway bypass valve assembly portion of the jump strut assembly shown in the closed position prior to landing.

Bypass passages 61 may be selectively opened and closed in accordance with the axial position of an internal bypass sleeve 62 within the outer support tube 10. When the main piston 7 is fully extended as shown in FIGS. 6, 7 and 11, a stop 63 on the metering pin 16 engages the forward end of the bypass sleeve 62, urging the bypass sleeve to the right blocking fluid flow through the bypass passages 61.

Figure 12:
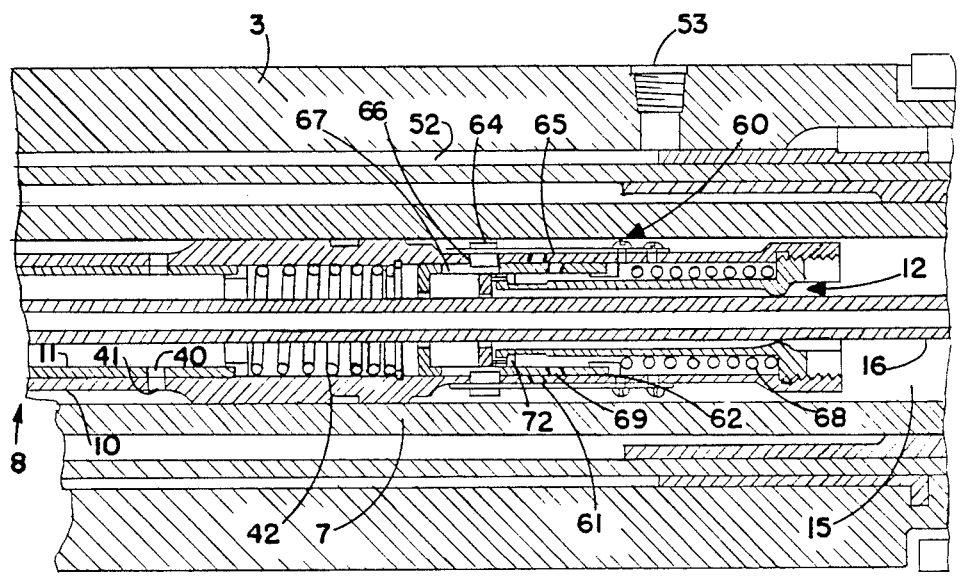

Prior to landing, the main strut piston 7 is fully extended, whereby the stop 63 on the metering pin 16 continues to push the internal bypass sleeve 62 axially outwardly (downwardly) so that the bypass holes 61 in the outer support tube 10 are closed by the bypass sleeve. Upon landing impact, oil pressure will build up in the lower piston chamber 15. This buildup of pressure acts on the radial outer ends of lock pins 64 carried by leaf springs 65 mounted on the exterior of the outer support tube 10 to overcome the opposing force of the leaf springs thus forcing the pins radially inwardly within respective radial openings 66 in the outer support tube 10. The radial openings 66 guide the pins 64 during their radial movement into grooves 67 in the bypass sleeve 62, thus locking the bypass sleeve in the closed position during the entire landing stroke even though the stop 63 on the metering pin 16 moves out of engagement with the bypass sleeve 62 as shown in FIG. 12. With the bypass passages 61 closed, all of the oil flow must be forced through the orifice 12, thus providing full stiffness capability for the dissipation of energy during the landing mode.

Figure 13:
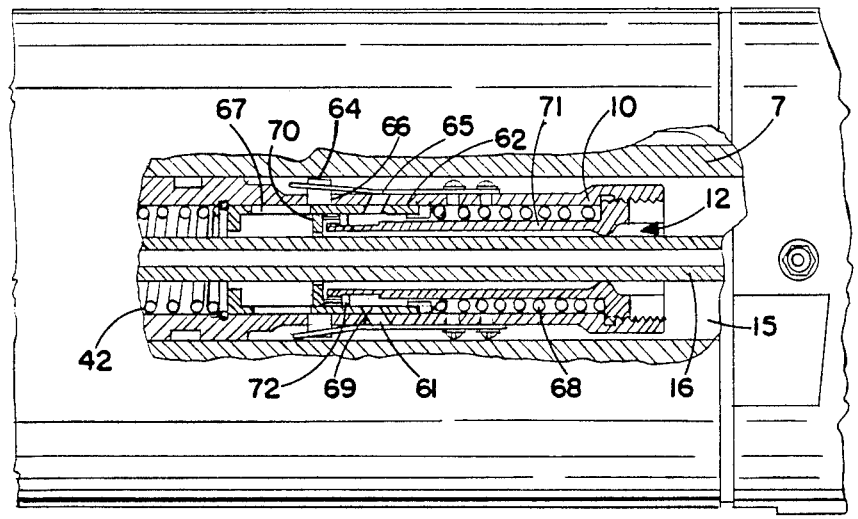
FIGS. 13 and 14 are enlarged fragmentary longitudinal sections showing such rough runway bypass valve assembly in the open position after landing.
Figure 14:
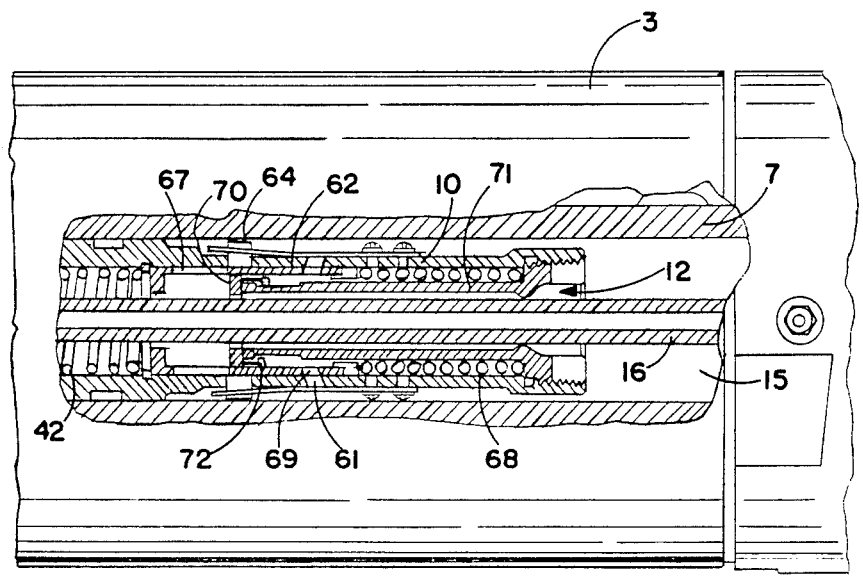

On recoil of the shock strut assembly 1, i.e., after the landing energy has been dissipated and the stored energy in the upper piston chamber 14 causes the main strut piston 7 to rebound, much like a spring, the pressure in the lower piston chamber 15 acting on the outer ends of the lock pins 64 will drop, thus allowing the leaf springs 65 to move the pins 64 out of the grooves 67 in the bypass sleeve 62 to unlock the bypass sleeve as shown in FIG. 13. With the bypass sleeve unlocked, a spring 68 acting on the outer (lower) end of the bypass sleeve 62 will push the bypass sleeve upwardly to bring holes 69 in the bypass sleeve into alignment with the bypass holes 61 in the outer support tube 10 thus opening the bypass holes to provide for bypass flow around the orifice 12 during rough runway operation. The spring 68 acting on the bypass sleeve 62 will normally maintain the bypass holes 61 open, closing only for the landing.

A flapper valve 70 may also be mounted interiorly within the bypass sleeve 62 to act as a rebound or recoil valve to dampen the outstroke of a weighted gear for normal bounce during taxiing. The flapper valve 70 is mounted for limited axial movement on the inner (upper) end of a delivery tube 71 concentrically mounted within the lower (bottom) end of the outer support tube 10. At the outer (lower) end of the flapper valve 70 are flow slots 72, whereby when the flapper valve is forced upwardly (to the left as viewed in FIGS. 12 and 13) by the force of the fluid flowing through the bypass holes 61, 69, the flow slots 72 in the flapper valve will permit unrestricted flow therethrough. However, on the recoil, the return flow through the orifice 12 and bypass holes 61, 69 causes the flapper valve 70 to move outwardly (downwardly) up against the inner end of the delivery tube 71, thus closing off the flow slots 72 through the flapper valve and forcing all of the return oil to flow through the delivery tube and orifice 12 in order to lift the supported weight of the aircraft as part of the return stroke.

Although the invention has been shown and described with respect to a certain preferred embodiment, it is obvious that equivalent alterations and modifications will occur to others skilled in the art upon the reading and understanding of the specification. The present invention includes all such equivalent alterations and modifications, and is limited only by the scope of the claims.

What is claimed is:

1. A jump strut assembly which is extendable on command for rotating the nose of an airplane upwardly during the take-off ground run comprising a main housing cylinder adapted to be affixed to the nose of the airplane, a jump cylinder axially movable within said main housing cylinder between a retracted position and an extended position relative to said main housing cylinder, lock means for releasably locking said jump cylinder against extension when in the retracted position, lock release means for releasing said lock means, fluid pressure means acting on said jump cylinder for moving said jump cylinder to the extended postion upon release of said lock means, a main strut piston axially movable within said jump cylinder, and means for preventing relative movement between said main strut piston and jump cylinder during movement of said jump cylinder to the extended position.

2. The assembly of claim 1 further comprising means for permitting relative movement of said main strut piston within said jump cylinder when said jump cylinder is in the retracted position.

3. The assembly of claim 2 wherein said main strut piston defines with said jump cylinder upper and lower piston chambers, and said means for permitting relative movement of said main strut piston within said jump cylinder comprises orifice means permitting restricted flow between said piston chambers during relative movement of said main strut piston within said jump cylinder.

4. The assembly of claim 3 wherein said means for preventing relative movement between said main strut piston and jump cylinder during extension of said jump cylinder comprises a support tube assembly axially slidably received in said jump strut piston, said support tube assembly comprising an outer tube fixed with respect to said jump cylinder for movement therewith, and an inner tube axially movable with respect to said outer tube for respectively closing and opening flow holes through said tubes through which the fluid flow through said orifice means must pass, and means for causing relative movement between said inner and outer tubes to block the flow holes therethrough for hydraulically locking said main strut piston against movement relative to said jump cylinder during extension of said jump cylinder.

5. The assembly of claim 4 wherein said last-mentioned means comprises spring means biasing said inner tube to a position blocking said flow holes.

6. The assembly of claim 5 further comprising means for overcoming the bias of said spring means to unblock said flow holes through said support tubes when said jump cylinder is in its fully retracted position.

7. The assembly of claim 6 wherein said means for overcoming the bias of said spring means comprises stop pin means affixed to said inner tube and engageable with a stop surface on said main housing cylinder to overcome the bias of said spring means when said jump cylinder is in the retracted position.

8. The assembly of claim 1 wherein said lock means comprises an expandable split lock ring, and means for expanding said lock ring radially outwardly into engagement with an internal shoulder in said main housing cylinder to lock said jump cylinder against extension relative to said main housing cylinder when said jump cylinder is in the retracted position.

9. The assembly of claim 8 wherein said means for expanding said lock ring comprises an annular trigger member mounted for axial movement relative to said lock ring, and a series of lock links having radial inner and outer edges captivated in respective annular grooves in said lock ring and trigger member, said trigger member being axially movable between a first position in which said lock links extend substantially radially between said lock ring and trigger member to expand said lock ring against said internal shoulder and a second position in which the radial inner edges of said lock links are moved to an overcenter position which allows said lock ring to contract so that said lock ring no longer engages said internal shoulder.

10. The assembly of claim 9 further comprising spring means for biasing said trigger member toward said first position.

11. The assembly of claim 10 further comprising an unlock piston which is movable upon command in a direction causing movement of said trigger member to said second position.

12. The assembly of claim 11 further comprising a manifold attached to said main housing cylinder for supplying hydraulic fluid to move said unlock piston in such direction causing movement of said trigger member to said second position.

13. The assembly of claim 1 wherein said fluid pressure means comprises a jump chamber within said main housing cylinder which is adapted to be charged with a high pressure gas that acts on said jump cylinder causing said jump cylinder to move to the extended position upon release of said lock means.

14. The assembly of claim 1 further comprising means for permitting said main strut piston to extend relative to said jump cylinder after said jump cylinder has been fully extended and there is no retracting load acting on said main strut piston.

15. The assembly of claim 14 wherein said main strut piston defines with said jump cylinder upper and lower piston chambers, and orifice means permit restricted flow between said piston chambers during relative movement of said main strut piston within said jump cylinder, said means for preventing relative movement between said main strut piston and jump cylinder comprising a support tube assembly axially slidably received in said main strut piston, said support tube assembly comprising an outer tube fixed with respect to said jump cylinder for movement therewith, and an inner tube axially movable with respect to said outer tube for respectively closing and opening flow holes through said tubes through which the fluid flow through said orifice means must pass, and means for causing relative movement between said inner and outer tubes to block said flow holes for hydraulically locking said main strut piston against movement relative to said jump cylinder during extension of said jump cylinder, said means for permitting said main strut piston to extend comprising additional flow holes through said tubes, and flapper valve means for blocking fluid flow through said additional flow holes from said lower piston chamber to said upper piston chamber while permitting fluid flow through said additional flow holes from said upper piston chamber to said lower piston chamber whenever the pressure in said lower piston chamber is less than the pressure in said upper piston chamber.

16. The assembly of claim 14 further comprising means for retracting said jump cylinder within said main housing cylinder after said main strut piston has been extended relative to said jump cylinder.

17. The assembly of claim 16 wherein said means for retracting said jump cylinder comprises valve means for venting said fluid pressure means, and means for applying a retract force to said jump cylinder.

18. The assembly of claim 17 wherein said fluid pressure means comprises a jump chamber within said main housing cylinder which is charged with a high pressure gas that acts on said jump cylinder to extend said jump cylinder upon release of said lock means, and said valve means is operative to vent said jump chamber to the atmosphere on command.

19. The assembly of claim 18 further comprising a recoil chamber within said main housing cylinder which is pressurized to apply a force on said jump cylinder urging said jump cylinder toward the retracted position.

20. The assembly of claim 19 further comprising accumulator means containing pressurized gas, and valve means for connecting said accumulator means to said recoil chamber upon venting of said jump chamber to pressurize said recoil chamber to cause said jump cylinder to retract.

21. The assembly of claim 19 further comprising accumulator means containing pressurized gas which is continuously connected to said recoil chamber whereby there is a build-up of pressure in said accumulator means during extension of said jump cylinder which causes said jump cylinder to retract upon venting said jump chamber.

22. The assembly of claim 1 wherein said main strut piston defines with said jump cylinder upper and lower piston chambers, and orifice means provide restricted flow between said piston chambers during relative movement of said main strut piston within said jump cylinder, and bypass means provide for additional flow from said lower piston chamber to said upper piston chamber whenever said jump strut assembly engages a bump during movement of the airplane along the ground except during extension of said jump cylinder.

23. The assembly of claim 22 wherein said bypass means comprises a bypass passage around said orifice means, a bypass sleeve axially movable with respect to said bypass passage between open and closed positions for respectively opening and closing said bypass passage, spring means for biasing said bypass sleeve toward the open position, and means for retaining said bypass sleeve in the closed position until after landing has taken place.

24. The assembly of claim 23 further comprising a support tube axially slidably received in said main strut piston, said support tube being fixed with respect to said jump cylinder for movement therewith, said orifice means being formed by a metering pin fixed with respect to said main strut piston for movement therewith, and an opening in said support tube through which said metering pin extends, said bypass passage extending through said support tube around said orifice means, and said bypass sleeve being axially slidable within said support tube for respectively opening and closing said bypass passage.

25. The assembly of claim 24 wherein said means for retaining said bypass sleeve in the closed position comprises a stop member on said metering pin engageable with said bypass sleeve to move said bypass sleeve to the closed position when said main strut piston is substantially fully extended relative to said jump cylinder.

26. The assembly of claim 25 wherein said means for retaining said bypass sleeve in the closed position further comprises slot means in said bypass sleeve, and pin means on said support tube movable into engagement with said slot means to retain said bypass sleeve in the closed position.

27. The assembly of claim 26 further comprising means responsive to a relatively high pressure within said lower piston chamber which occurs during landing of the aircraft for moving said pin means into engagement with said slot means to retain said bypass sleeve in the closed position.

28. The assembly of claim 27 further comprising means for moving said pin means out of engagement with said slot means in response to a substantial drop in the pressure in said lower piston chamber which occurs after landing has taken place.

29. The assembly of claim 28 wherein said means for moving said pin means into engagement with said slot means comprises an external surface on said pin means exposed to the fluid pressure in said lower piston chamber, and said means for moving said pin means out of engagement with said slot means comprises leaf spring means providing a biasing force urging said pin means out of engagement with said slot means.

30. The assembly of claim 24 further comprising flapper valve means for permitting unobstructed flow through said bypass passage when said bypass sleeve is in the open position during retraction of said main strut piston within said jump cylinder and for blocking return flow through said bypass passage during extension of said main strut piston relative to said jump cylinder.

31. The assembly of claim 30 further comprising a delivery tube concentrically mounted within said support tube, said delivery tube containing said opening for said metering pin, and said flapper valve means being mounted for limited axial movement into and out of engagement with one end of said delivery tube to respectively block and permit fluid flow through said bypass passage while said bypass sleeve is in the open position.

32. The assembly of claim 31 wherein said flapper valve means includes flow slots for flow of fluid through said flapper valve means when said flapper valve means has moved out of engagement with said delivery tube.

33. A jump strut assembly which is extendable on command for rotating the nose of an airplane upwardly during the take-off ground run comprising a main housing cylinder, a jump cylinder axially movable within said main housing cylinder, lock means for releasably locking said jump cylinder against extension when in a retracted position within said main housing cylinder, lock release means for releasing said lock means, means for moving said jump cylinder to an extended position relative to said main strut piston upon release of said lock means, a main strut piston axially movable within said jump cylinder to dissipate energy, and means for locking said jump strut against movement relative to said jump cylinder only during extension of said jump cylinder.

34. The assembly of claim 33 further comprising means for permitting said main strut piston to extend relative to said jump cylinder after such extension of said jump cylinder.

35. The assembly of claim 34 further comprising means for retracting said jump cylinder within said main housing cylinder following extension of said main strut piston relative to said jump cylinder.

36. The assembly of claim 35 wherein said means for moving said jump cylinder to an extended position comprises a jump chamber within said main housing cylinder which is chargeable with a high pressure gas that acts on said jump cylinder causing said jump cylinder to extend upon release of said lock means, and said means for retracting said jump cylinder comprises vent means for venting said jump chamber on command, and means for applying a retract force to said jump cylinder.

37. The assembly of claim 36 wherein said means for applying a retract force to said jump cylinder comprises an accumulator containing pressurized gas, a recoil chamber within said main housing cylinder which when pressurized applies a retraction force to said jump cylinder, and means providing fluid communication between said accumulator and recoil chamber for pressurizing said recoil chamber.

* * * * *